United States Patent
Engle

[15] 3,707,309
[45] Dec. 26, 1972

[54] HYDRAULICALLY OPERATED HAND BRAKE - SERVICE BRAKE SYSTEM FOR RAILWAY CARS

[72] Inventor: Thomas H. Engle, Cape Vincent, N.Y.

[73] Assignee: General Signal Corporation

[22] Filed: June 4, 1971

[21] Appl. No.: 150,054

[52] U.S. Cl. .....................303/13, 188/265, 303/21, 303/89
[51] Int. Cl. .............................................B60t 17/16
[58] Field of Search.....303/2, 13, 10, 89; 188/106 P, 188/265; 60/52; 91/43–44

[56] References Cited

UNITED STATES PATENTS

| | | | |
|---|---|---|---|
| 3,508,794 | 4/1970 | Engle | 303/89 |
| 3,597,016 | 8/1971 | Gachot | 303/89 |
| 3,622,207 | 11/1971 | Engle | 303/89 |

Primary Examiner—Milton Buchler
Assistant Examiner—John L. McLaughlin
Attorney—Dodge & Ostmann

[57] ABSTRACT

The disclosure concerns fluid operated brake systems for railway cars incorporating hydraulic brake cylinders which serve both service braking and hand braking functions. The brake cylinders on both trucks are operated by a single hand brake control unit, but are embodied in separate service brake circuits supplied with hydraulic fluid from two reservoirs, one of which also supplies the hand brake circuit. The reservoirs are interconnected so as to permit maximum utilization of the total volume of hydraulic fluid without depleting either below the minimum level required to satisfy the demands of the equipment it supplies. Preferably, the reservoir which serves the hand brake and one service brake is divided to provide separate sources for these circuits.

5 Claims, 1 Drawing Figure

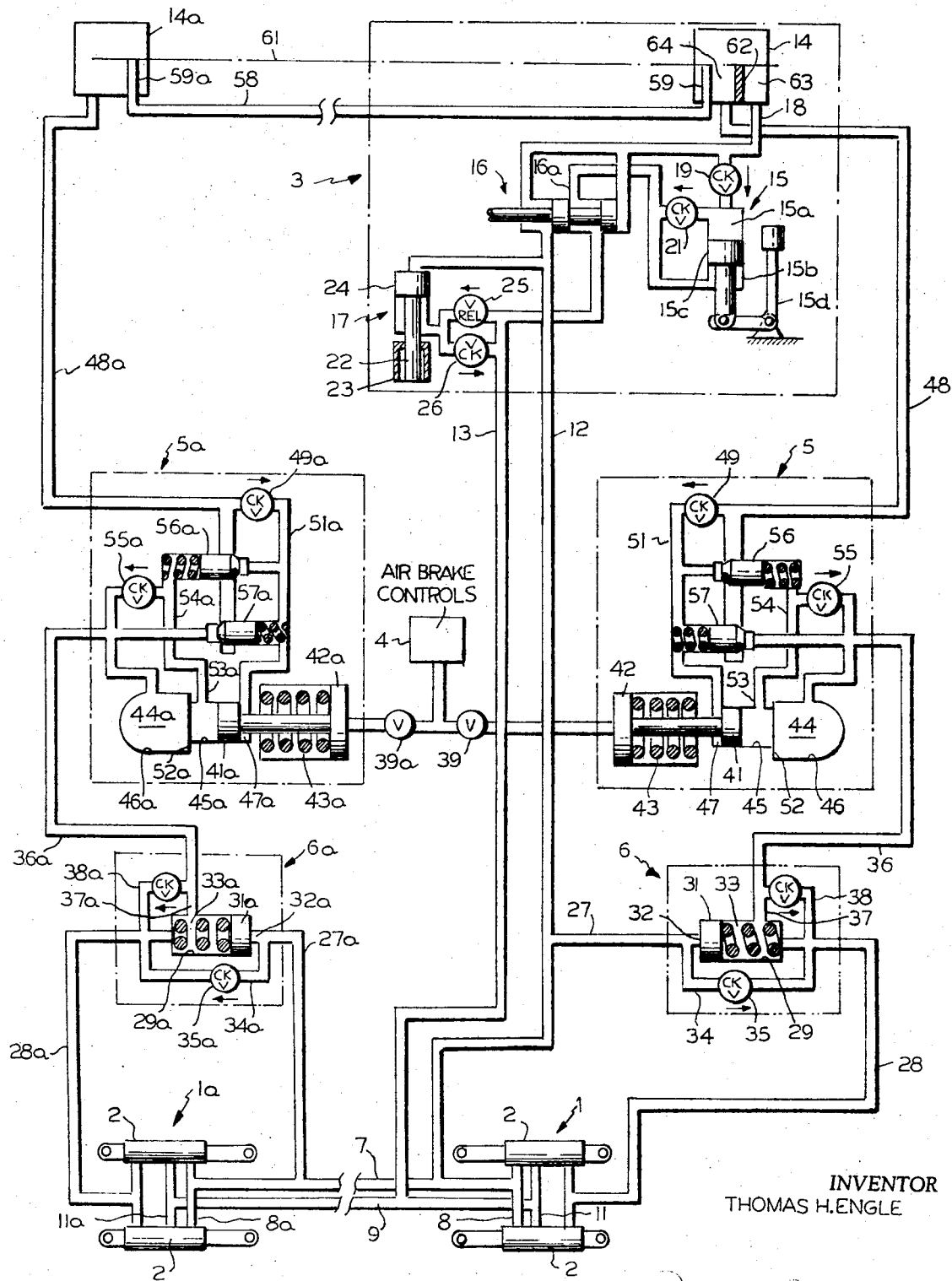

HYDRAULICALLY OPERATED HAND BRAKE - SERVICE BRAKE SYSTEM FOR RAILWAY CARS

BACKGROUND OF THE INVENTION

U.S. Pat. No. 3,508,794, granted Apr. 28, 1970, discloses hydraulic brake systems for railway cars in which the brake cylinders serve both a service brake circuit and a hand brake circuit. When this system is applied to rapid transit passenger cars, it sometimes is desirable, either to provide a safety margin or to facilitate incorporation of wheel slip controls, to incorporate the brake cylinders for the two trucks in separate service brake circuits, each of which has it own air-to-hydraulic booster. This desire can be satisfied easily by merely using a combined service brake-hand brake system for one set of brake cylinders and providing just a service brake circuit for the other set. However, this approach requires either two different kinds of brake cylinders, i.e., some with and some without the lock needed for hand braking, or that the hydraulic lines for the lock actuating motors be omitted on one of the trucks. Some railroads consider both of these alternatives unacceptable.

In cases where the brake cylinders and their installations are required to be identical, three possible designs might be considered. In one, each set of cylinders is provided with a combination hand brake — service system, but this approach presents operational difficulties and is expensive because it employs two hand brake control units. A second design involves use of a combination hand brake — service brake system for one set of cylinders, a separate service brake circuit for the other set, and flow connections which join the lock and unlock motors of the first set of cylinders with the corresponding motors of the second set. In this scheme, all of the locks are operated by the hand brake control unit, but only one set of cylinders actually is rendered effective to perform the hand braking functions. Therefore, this proposal does not make full use of the equipment which is provided. The final alternative consists in providing separate service brake circuits for the two sets of cylinders and in using a common hand brake circuit to actuate all of the cylinders and their locks. On the surface, this approach appears to be the most attractive one; however, if it employs air-to-hydraulic boosters of the type disclosed in U.S. Pat. No. 3,513,656, granted May 26, 1970, which afford double-acting slack compensation, and the boosters are joined to their associated brake cylinders through a translating unit which employs a by-pass path (see, for example, FIGS. 11–16 of U.S. Pat. No. 3,508,794), the system could be deemed unsafe. The reason for this is that alternate applications of the hand and service brakes effect transfer of oil from the reservoir which supplies the hand brake and one service brake to the reservoir which supplies only the other service brake. Thus, in time, the first reservoir will be depleted of oil. As a result, the hand brake will be disabled, and service braking on one truck will be lost.

SUMMARY OF THE INVENTION

The object of this invention is to provide an improved hydraulic hand brake - service brake system which has separate service brake circuits for the two trucks, and in which the brake cylinders and their installations are identical. According to the invention, a common hand brake circuit actuates both sets of brake cylinders, the air-to-hydraulic boosters afford double-acting slack compensation, and each set of brake cylinders is joined to the hand brake circuit and one of the boosters through a translating unit which includes a by-pass. The system has two reservoirs, one for the hand brake and one booster and another for the second booster, and excessive accumulation of oil in the second reservoir is precluded by fluid transfer apparatus which allows flow between the reservoirs as needed to equalize their fluid levels. This transfer apparatus, however, is designed to interrupt flow from either reservoir when the quantity of oil therein is reduced to the minimum required for proper operation of the equipment which it supplies. This measure prevents total loss of braking capability in the even of a leak in one of the circuits, and thus preserves the safety margin inherently afforded by inclusion of separate service brake circuits. As an added safety precaution, the reservoir which serves the hand brake and one booster is subdivided to provide separate sources of oil for these two demands. This feature insures that leakage from or operation of either brake will not adversely affect the other. It is preferred that the source which supplies the booster be in the fluid transfer path which interconnects the two reservoirs because this arrangement affords maximum insurance against loss of service braking capability.

BRIEF DESCRIPTION OF THE DRAWING

The preferred embodiment of the invention is described herein with reference to the accompanying drawing whose single FIGURE is a schematic diagram of the improved brake system.

DESCRIPTION OF PREFERRED EMBODIMENT

The system shown in the drawing includes two sets 1 and 1a of identical hydraulic brake cylinders 2, one for each truck of the car, a hydraulic hand brake control unit 3, a service brake comprising air brake control apparatus 4 and a pair of air-to-hydraulic boosters 5 and 5a, and two translating and valving units 6 and 6a through which brake cylinder sets 1 and 1a are joined to the hand brake unit and the boosters. Each of the brake cylinders 2 includes a lock constructed in accordance with the teachings in application Ser. No. 882,655, filed Dec. 5, 1969, and which is actuated by hydraulic lock and unlock motors. The lock motors of the four cylinders 2 are interconnected by conduits 7, 8 and 8a, and the four unlock motors are interconnected by conduits 9, 11 and 11a; therefore, all locks are applied and released simultaneously.

The lock and unlock circuits 7, 8, 8a and 9, 11, 11a of the brake cylinders are connected, respectively, will control lines 12 and 13 which are selectively pressurized and vented by hand brake control unit 3. This unit includes a reservoir 14, a manually operated, differential area piston pump 15, a manually operated reversing valve 16, and a lock indicator 17. The head end working space 15a of pump 15 is connected with reservoir 14 through conduit 18 and inlet check valve 19, and with the rod end working space 15b through discharge check valve 21. Space 15b, on the other hand, is joined directly to the inlet passage 16a of reversing valve 16. The effective area of the head end of pump piston 15c is twice the effective area of the rod end; therefore, on each upward stroke of the piston, one-half of the oil displaced from space 15a is delivered to valve 16, and the balance is transferred to space 15b. On the following downward stroke of piston 15c, the oil in space 15b is discharged to valve 16, and space 15a is again filled with oil through inlet check valve 19. Reversing valve 16 is a two-position valve and serves to direct the output of pump 15 to a selected one of the conduits 12 and 13 while connecting the remaining conduit with reservoir 14 through conduit 18.

The indicator 17 of unit 3 includes a visual signal member in the form of a rod 22 which is retracted into or moved out of a housing 23 depending upon whether the cylinder locks are released or applied. Member 22 is actuated automatically by a double-acting motor 24 whose opposed working spaces are connected with control lines 12 and 13, respectively. One of these connections contains a relief and by-pass check valve combination which insures that motor 24 will not retract member 22 until the pressure in line 13 rises slightly above the level required to effect release of the locks, but which does not impede extension movement of that member. In the illustrated embodiment, the valve combination 25, 26 is located in the connection between line 13 and the rod end space of motor 24 and controls the admission of pressure fluid to the motor.

The control line 12, which serves to energize the lock motors of brake cylinders 2, also is connected with the working spaces of the four cylinders through either conduit 27, translating unit 6 and conduit 28, or through line 7, conduit 27a, translating unit 6a and conduit 28a. The units 6 and 6a are identical and take the form of the FIG. 1 embodiment of application Ser. No. 49,851, filed June 25, 1970, now U.S. Pat. No. 3,622,207. Each unit comprises a cylinder 29 or 29a containing a spring biased reciprocable piston 31 or 31a which defines a pair of opposed working chambers 32, 33 or 32a, 33a; the chambers 32 and 33 communicating, respectively, with conduits 27 and 28, and the chambers 32a and 33a communicating, respectively, with conduits 27a and 28a. Thus, when control line 12 is pressurized, the pistons 31 and 31a move to contract chambers 33 and 33a, respectively, and displace oil into the working spaces of brake cylinders 2. The oil transferred to the cylinders extends them and effects partial take-up of brake shoe clearance, but the strokes of the translator pistons are so selected that normally this fluid transfer action will not effect full application of the brakes. Therefore, each of the units 6 and 6a includes a by-pass path 34 or 34a through which the additional oil needed to finally set the brakes is introduced into the brake cylinder circuits. Each of these paths contains a check valve 35 or 35a which is oriented to prevent reverse flow, and thus to insure that the service brake can develop braking pressures in brake cylinders 2 when the hand brake is released.

Translating units 6 and 6a also join the service brake circuits to brake cylinders 2, so the chamber 33 or 33a of each unit is connected to the associated booster 5 or 5a through a conduit 36 or 36a. These conduits are equipped with shut-off valves defined by the translator pistons 31 and 31a and the ports 37 and 37a located in the walls of cylinders 29 and 29a. The shut-off valves close automatically during a hand brake application when the translator pistons approach the ends of their strokes, and therefore development of the desired hand braking pressure in cylinders 2 is not precluded by escape of oil through the boosters 5 and 5a. However, each shut-off valve is by-passed by a check valve controlled path 38 or 38a so that a service brake application can be effected while the hand brake is applied.

Air brake control apparatus 4, which preferably incorporates the teachings of U.S. Pat. No. 3,536,360, granted Oct. 27, 1970, is connected with the boosters 5 and 5a through cut-out valves 39 and 39a and supplies them with a pneumatic command pressure which is to be transduced into proportional hydraulic braking pressures in cylinder lines 28 and 28a. The illustrated boosters are identical and conform to the FIG. 7 embodiment of U.S. Pat. No. 3,513,656; therefore, a brief description of one of them should suffice for present purposes. Booster 5 comprises a differential area pump piston 41 which is moved on its discharge and return strokes by an air motor 42 which responds to the pneumatic output of apparatus 4 and a spring 43, respectively, and which is provided with a head end working space 44 which is connected in a closed circuit with the brake cylinders 2 of set 1 via conduits 36 and 28 and translating unit 6. The cylinder in which piston 41 reciprocates includes a piston-fitting portion 45 and an enlarged end portion 46, the latter serving to connect head end space 44 with rod end space 47 during the terminal portion of the discharge stroke of piston 41. With this arrangement, the discharge stroke of piston 41 is divided into an initial stage in which the volumetric displacement is high and the pressure transducing ratio is low, and a second stage in which the displacement per inch of stroke is low and the transducing ratio is high. As a result, the length of the piston stroke can be minimized without preventing the booster from developing the high output pressure needed for service braking action.

Booster 5 is connected with the reservoir 14 of hand brake control unit 3 via conduit 48 and includes mechanisms for transferring oil to and from the reservoir as needed to afford double-acting slack compensation. Factors, such as wear, which increase brake shoe clearance are compensated by a make-up pump which includes piston 41 and the rod end space 47. This space is maintained liquid-filled by the oil delivered thereto through conduit 48, check valve 49 and passage 51 during the first stage of each discharge stroke of piston 41. Therefore, on the return stroke, piston 41 will displace oil from this space. As the piston retreats from cylinder step 52 to port 53, the displaced oil is delivered to the closed circuit of the brake cylinders via port 53, passage 54 and check valve 55. The quantity of oil thus transferred depends upon the location of port 53 and is slightly greater than that needed to make up for normal shoe wear and leakage occuring during the preceding brake application. During the balance of the return stroke, the oil displaced from space 47 is returned to reservoir 14 through a vent valve 56, which is maintained closed by the pressure in space 47 during the initial stage of the retraction stroke. Factors, such as shoe replacement and the excess quantity of oil delivered to space 44 by the make-up pump, which decrease shoe clearance are compensated by a relief valve 57 which diverts fluid displaced from working space 44 to reservoir 14 when the pressure in the space exceeds the relatively low level (e.g., 30 p.s.i.) required for cylinders 2 to take-up shoe clearance. Inclusion of valve 57 insures that piston 41 will enter the terminal or high pressure stage of its discharge stroke and will come to rest at approximately the same position at the completion of each such stroke. Therefore, it establishes a liquid column of uniform length between piston 41 and the pistons of cylinders 2 during brake applications, and thereby insures establishment of the same shoe clearance each time the brakes are released. Valve 57 is urged closed by a spring and by the pressure in rod end space 47, so it is closed automatically when piston 41 enters cylinder enlargement 46.

Booster 5a serves brake cylinders 2 in set 1a in the same way as booster 5 serves the cylinders in set 1, but its slack compensating mechanism is provided with a separate oil reservoir 14a, normally located at the opposite end of the car from hand brake control unit 3. The two reservoirs 14 and 14a are positioned at approximately the same elevation on the car and are interconnected by an equalizing pipe 58 having upturned ends 59 and 59a which terminate in the reservoirs at a common horizontal plane 61. This pipe transfers oil back and forth between the reservoirs as necessary to equalize their fluid levels, but automatically stops such fluid exchange when the levels descend below plane 61. The vertical spacing between plane 61 and the bottoms of the reservoirs 14 and 14a is so selected that the quantity of oil in neither reservoir will be reduced below the minimum required for normal operation of the associated hydraulic circuit or circuits. As an added safety measure, reservoir 14 is provided with a vertical partition 62 which divides its lower region, and preferably the entire region below plane 61, into separate subcompartments 63 and 64 which are connected, respectively, with hand brake conduit 18 and booster conduit 48. The provision of these separate oil sources insures that neither leakage from nor operation of either circuit will starve the other of the oil needed for proper operation. Moreover, since equalization pipe 58 communicates with reservoir 14 through the compartment 64 which supplies booster 5, the illustrated fluid transfer scheme gives preference to the needs of the service brake.

In light of the descriptions in the patents and patent applications mentioned above, it is unnecessary here to present a detailed description of system operation. However, it might be helpful to focus attention on the operating conditions which emphasize the importance of the invention. As pointed out in application Ser. No. 49,851, if the service brake is applied while a hand brake application is in effect and the hand brake is then released, the pistons 31 and 31a of the translating units 6 and 6a will retract and impose flow demands on the boosters 5 and 5a. Unless each booster has sufficient capacity to satisfy the demand, brake cylinder pressure will be dissipated and, in effect, the service brake will also be released. In order to prevent this, the discharge capacity of each booster is made considerably larger than the volumetric capacity of the translator (i.e., the volume swept by piston 31 or 31a as it moves between its limiting positions). Typically, the capacities of the low and high pressure discharge stages of the booster are equal, and each is twice the capacity of the translating unit. With this arrangement, the brake shoe clearance established by unit 6 or 6a after cycling of the hand brake necessarily will be smaller than the clearance established by booster 5 and 5a after cycling of the service brake. Thus, if a hand brake application follows a service brake application and release, it is evident that translator pistons 31 and 31a will reach the limits of their strokes before the associated brake cylinders 2 have taken up shoe clearance, and that consequently a substantial quantity of oil will be introduced into each brake cylinder circuit through bypass check valves 35 or 35a. This oil, of course, remains in the brake cylinder circuits when the hand brake is released. Now, since the relief valves 57 and 57a in the boosters serve to bleed oil from the brake cylinder circuits as needed to compensate for shoe clearance-decreasing effects and to allow the pump pistons 41 and 41a to enter the high pressure stages of their discharge strokes, and since the capacity of low pressure stage of each booster is greater than the capacity of the associated translating unit 6 or 6a, it follows that the oil added to the brake cylinder circuits through by-pass check valves 35 and 35a during the hand brake application will be withdrawn from the circuits through the relief valves during the next service brake application. Although all of the oil added to the brake cylinder circuits during the hand brake application is supplied by reservoir 14 and that amount withdrawn from the circuit of cylinder set 1a is returned to reservoir 14a during the subsequent service brake application, this fact is of no significance because equalization pipe 58 prevents permanent retention of that oil in reservoir 14a. Therefore, regardless of the number of times the two brakes are cycled, reservoir 14 will not be depleted of the oil needed for proper operation of the equipment it supplies.

It also should be noted that, since the fluid transfer action of pipe 58 automatically ceases when the fluid levels in the reservoirs 14 and 14a reach plane 61, interconnection of the two hydraulic service brake circuits through pipe 58 does not eliminate the safety margin which inclusion of the second hydraulic service brake circuit provides. In the event either service brake circuit fails, the other will be effective to provide half the normal braking effort. Moreover, since reservoir 14 provides separate sources 63 and 64 for unit 3 and booster 5, failure of either service brake circuit will have no adverse effect upon hand brake capability unless the failure is of such nature, e.g., rupture of line 28 and 28a, as to preclude development of pressure in the associated set of brake cylinders.

I claim:

1. A fluid operated brake system for a railway car comprising
   a. two sets 1, 1a of hydraulic brake cylinders 2 having separate actuating circuits 28, 28a and common locking and unlocking circuits 7, 8, 8a and 9, 11, 11a;
   b. a hydraulic hand brake control unit 3 including a reservoir 14 and manually operated means 15, 16 for withdrawing fluid from the reservoir and delivering it under pressure selectively to either one of two control lines 12, 13 while permitting return flow from the remaining line to the reservoir;

c. the first control line 12 being connected with the locking circuit 7, 8, 8a, and the second control line 13 being connected with the unlocking circuit 9, 11, 11a;

d. a pair of hydraulic translating units 6, 6a each of which includes a cylinder 29 or 29a containing opposed working chambers 32, 33 or 32a, 33a separated by a reciprocating piston 31 or 31a, and by-pass means 34, 35 or 34a, 35a which interconnects said chambers and allows flow only from the first 32 or 32a to the second 33 or 33a, e. the first working chambers 32, 32a of the translating units being connected with the first control line 12, and the second working chambers 33, 33a of the units being connected, respectively, with the actuating circuits 28, 28a;

f. service brake apparatus including means 4 for producing a pneumatic command signal of selected magnitude, and a pair of air-to-hydraulic boosters 5, 5a connected, respectively, with the actuating circuits 28, 28a and serving to develop in those circuits hydraulic pressures proportional to said pneumatic command signal;

g. each booster being of the double-acting slack-compensating type, the first 5 serving to transfer fluid between one actuating circuit 28 and the reservoir 14 of said control unit 3 and the other serving to transfer fluid between the other actuating circuit 28a and a separate reservoir 14a; and h. fluid transfer means 58, 59, 59a interconnecting the two reservoirs 14, 14a and serving automatically to allow flow between them as needed to equalize their fluid levels but to interrupt flow from either when the fluid level therein decreases to a predetermined minimum elevation 61.

2. A brake system as defined in claim 1 in which the fluid transfer means comprises a conduit 58 whose opposite ends 59, 59a are positioned in the reservoirs 14, 14a at said predetermined elevation 61 and the balance of which is at a lower elevation.

3. A brake system as defined in claim 1 in which the lower region of the reservoir 14 of said control unit 3 is divided by a partition 62 into two compartments, one compartment 63 communicating with said manually operated means 15, 16 of the hand brake unit 3 and the other compartment 64 communicating with the first booster 5.

4. A brake system as defined in claim 3 in which the partition 62 extends upward to said predetermined elevation 61.

5. A brake system as defined in claim 3 in which
a. the fluid transfer means comprises a conduit 58 whose opposite ends 59, 59a are positioned in the reservoirs 14, 14a at said predetermined elevation 61 and the balance of which is at a lower elevation; and
b. the end 59 of the conduit 58 at the reservoir 14 of said control unit 3 is within said other compartment 64 which communicates with the first booster 5.

* * * * *